United States Patent [19]

Shacklett, III

[11] Patent Number: 5,292,566

[45] Date of Patent: Mar. 8, 1994

[54] BATTERY LABEL WITH NON-SHRINKABLE TOP LAYER

[75] Inventor: James H. Shacklett, III, Ambler, Pa.

[73] Assignee: National Label Company, Lafayette Hill, Pa.

[21] Appl. No.: 527,220

[22] Filed: May 22, 1990

[51] Int. Cl.⁵ ............................................. H01M 2/02
[52] U.S. Cl. ......................................... 428/40; 40/299; 40/306; 40/310; 40/630; 40/638; 428/77; 428/192; 428/194; 428/195; 428/203; 428/209; 428/220; 428/353; 428/354; 428/457; 428/463; 428/480; 429/167; 429/175; 429/177
[58] Field of Search ............... 428/203, 354, 910, 457, 428/463, 77, 40, 220, 195, 353, 192, 194, 480, 209; 40/299, 306, 310, 630, 638; 429/167, 175, 177

[56] References Cited

U.S. PATENT DOCUMENTS

| | | | |
|---|---|---|---|
| 4,313,986 | 2/1982 | Magnotta | 428/202 |
| 4,511,416 | 4/1985 | Karpiloff | 428/35.9 |
| 4,608,323 | 8/1986 | Zaborney | 429/167 |
| 4,627,154 | 12/1986 | Pattison | 429/167 |
| 4,801,514 | 1/1989 | Will | 428/910 |
| 5,085,906 | 2/1992 | Ast | 40/299 |

FOREIGN PATENT DOCUMENTS

| | | | |
|---|---|---|---|
| 123160 | 7/1984 | Japan . | |
| 123161 | 7/1984 | Japan . | |
| 38964 | 2/1989 | Japan . | |
| 1387619 | 3/1975 | United Kingdom | 429/167 |

*Primary Examiner*—Ellis P. Robinson
*Assistant Examiner*—Nasser Ahmad
*Attorney, Agent, or Firm*—Robert F. Zielinski

[57] ABSTRACT

A multi-layer label for a dry-cell battery, having an outer layer comprised of non-shrinkable plastic material.

18 Claims, 2 Drawing Sheets

BATTERY LABEL WITH NON-SHRINKABLE TOP LAYER

BACKGROUND OF THE INVENTION

"Primary" batteries are those that, once discharged, are not readily capable of being recharged, and as a result, are discarded. Early primary batteries used liquid electrolytes for power and were not very portable. As technology advanced, a "dry" process for combining energy-generating compounds was developed which allowed for greater battery portability. These primary batteries became known as "dry cell" batteries.

A cross-sectional diagram of a typical ready-to-use consumer dry cell battery of the prior art is provided in FIG. 3. The energy generating components of that battery are encased within a metal canister, referred to as the battery wall, battery can, or battery cell. The battery can itself is typically encased in a battery cover. Such battery covers can serve three functions. First, they may insulate or otherwise protect the materials contained in the battery cell from the outer environment. Second, they may protect the consumer and the product into which the battery is placed from battery leakage. Third, they provide a surface for affixing a labelling image or other decoration identifying the product.

Until recently, most battery makers typically enclosed battery cans in "metal jacket" battery covers, with a protective fiberboard layer of insulation between the metal jacket and the battery can to prevent shorting. The labelling image in a metal jacket cover is imprinted on the jacket. Battery manufacturers that still use metal jacket covers typically contract with independent sources for the supply of such covers. These battery manufacturers typically apply the metal jacket covers and insulating fiberboard to the battery cans in the final stage of the battery manufacturing process.

Metal jacket battery covers suffer from two principal drawbacks. First, the metal casing of the cover is relatively thick (up to 3/64th of an inch) especially when combined with the insulating fiberboard layer. Within the limits of each battery size, the cover thickness limits the volume available to store chemical compounds within the battery can. Since battery life is a function of both the type and amount of compounds used, use of these relatively thick metal jacket covers leads to reduced battery life. Second, metal jacket covers allow a relatively high incidence of battery can leakage wherein inner substances leak through both the battery can and the metal jacket cover. Such leakage may result in battery short circuits, thereby terminating this battery's life. Additionally, this leakage may cause outwardly visible discoloration and corrosion, which, though relatively harmless to a battery from a functional standpoint, can seriously erode consumer confidence in a battery manufacturer's product.

By the mid-1980s, an alternative battery cover system was developed and made possible by technological breakthroughs in applications for polyvinyl chloride, or "PVC". PVD is a clear, plastic material that meets or exceeds the durability, flexibility, and strength characteristics of a metal jacket with much less thickness of material. In PVC-based battery covers, one or more very thin layers of PVC replace both the metal jacket and fiberboard insulating layer of the traditional metal jacket cover. Typically, a hard grade of PVC film is employed in such constructions, and this material may be referred to as "HPVC". Since PVC-based covers are considerably thinner than their metal jacket counterparts, they allow for much more dry cell material to be included in an enlarged battery cell, and thus allow for relatively longer-lived batteries. Other positive characteristics of PVC, including its strength, flexibility, and durability, allow PVC-based battery covers to perform the leak-prevention and insulation functions of battery covers better than metal jacket battery covers. Finally, PVC is a superior medium over the metal jacket for the printing of battery label information and decoration. For alkaline batteries, the combination of alkaline cell material and the larger cell size (achieved through use of the thinner PVC battery covers) leads to a dramatic increase in battery life. As a result, alkaline battery manufacturers have rapidly adopted the new PVC-based battery cover technology.

Pressure-sensitive PVC battery covers are flat covers, sometimes referred to as "labels", for ready-to-use consumer dry-cell batteries. Typically, pressure sensitive PVC battery labels have the following characteristics: (1) one or more layers of PVC film designed to allow for shrinkage in only the hoop (circumferential) direction when applied to the battery body, (2) printed label information and other decoration, (3) a layer of metal, typically vapor-deposited deposited aluminum, (4) a layer of adhesive material which allows the label to adhere to the battery body, and (5) a backer or liner which is removed just before the label is applied by the battery manufacturer. Pressure sensitive battery labels are normally sized so that the label is fractionally longer than the battery can at both ends. In applying these labels to batteries, the labels are initially removed from their backer and wrapped around the battery can. Next, the wrapped battery passes through a small heating unit where the ends of the label are heated, causing the label to shrink circumferentially (in the hoop direction) at its ends where it extends beyond the battery body. This shrinkage causes the label to wrap tightly around the ends of the battery can, forming a tight protective seal.

Pressure sensitive PVC labels can be arranged in a number of different configurations depending on, among other factors, the number of PVC layers used. Labels composed of a single layer of PVC are known as monofilm labels, those formed of two layers of PVC are known as duplex labels, and labels composed of three layers of PVC are known as triplex labels. As mentioned above, these labels typically include a thin metal layer, which gives the label a bright background and an overall appearance superior and brighter than that achievable through printing of metallic inks alone. Depending on the position of the metal layer relative to the PVC, the labels are further classified. For example, a metal-down duplex label has two layers of PVC with a metal layer disposed between the bottom (or innermost) layer of PVC and the battery body. Similarly, in a metal-up duplex label the metal layer lies between the two PVC layers. The position of the metal layer and the number of PVC layers used in a given application depend on the battery cell involved as well as battery-manufacturer preference.

Prior art pressure sensitive labels such as those disclosed by Ast et al. in U.S. Pat. No. 4,801,514, have all used shrinkable films for their top or outermost layer. These films, typically HPVC of varying thickness, shrink around the ends of the battery can, trapping the other layers of the multilayer label beneath them. The prior art teaches the necessity of these shrinkable top layers, and recites defects such as folds, seam-lifts, and visual imperfections which result from insufficient or improper shrinkage of the top layer of a multilayer battery label.

SUMMARY OF THE INVENTION

The present invention, by substantially eliminating shrinkage of the topmost layer in multilayer battery labels, reduces the incidence of defects at the ends of such labels where they are heated to cause shrinkage over the end faces of the batteries to which they are applied. In addition, the non-shrinkable materials employed in practicing the present invention are harder and have a higher surface gloss than common HPVC films used in the prior art as top layers, and thus yield a better overall appearance for the label.

DETAILED DESCRIPTION OF THE INVENTION

Figure 1:
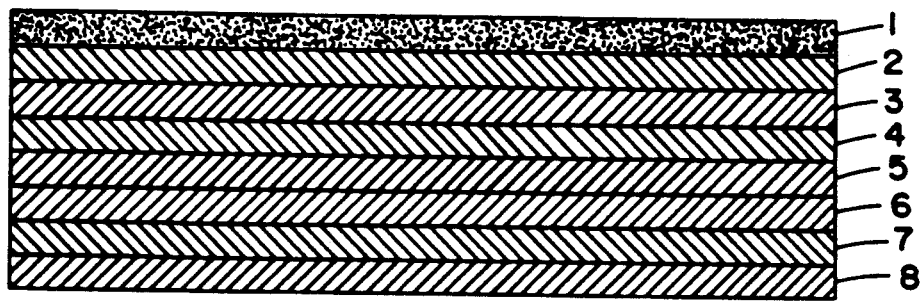
FIG. 1 shows a cross-sectional view of a multilayer battery label according to the present invention.
2.

Referring to FIG. 1, there is shown a multilayer label having a bottom adhesive layer 3, metal layer 4, a bottom plastic layer 5, an imprint layer 6, an adhesive layer 7, and a non-shrinkable plastic layer 8. The layers are ordered so that bottom adhesive layer 3 lies closer to the battery body than metal layer 4 when the label is affixed to a battery body. Prior to its application on a battery body, the label of FIG. 1 may be detachably arranged on a backing 1 having adhesive repellent layer 2. Typically, adhesive repellent layer 2 will be formed of silicone. Bottom plastic layer 5 is typically formed of poly vinyl chloride (PVC) or hard poly vinyl chloride (HPVC) film. Bottom plastic layer 5 may also be formed from other plastic films or foils including those which are shrinkable or stretchable. Metal layer 4 may be composed of aluminum and is preferably vapor deposited on plastic layer 5. Conventional pressure sensitive and laminating adhesives well known in the art may be employed. Plastic layer 8 is preferably a hard, glossy plastic of minimum thickness, such as a 5 micron film of polyethylene terephthalate (PET), or other polyester, polypropylene, or non-shrinkable PVC material. Such materials typically exhibit shrinkage of less than 3% at temperatures of 250° F. or greater. (Shrinkable plastic films, on the other hand, are typically expected to exhibit shrinkages of greater than 35% at temperatures of under 200° F.)

Figure 2:
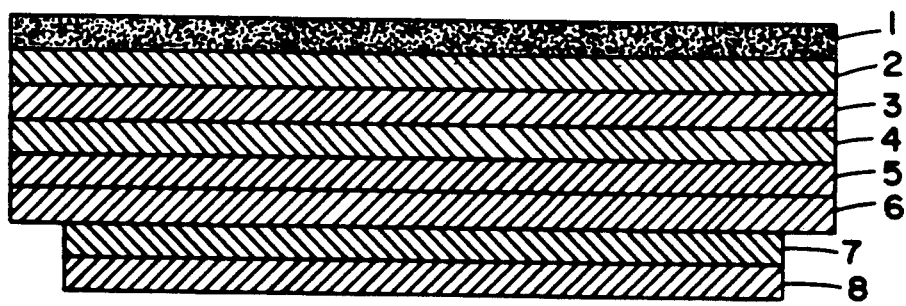
FIG. 2 shows a cross-sectional view of an alternative embodiment of a multilayer battery label according to the present invention.
3.
Figure 3:
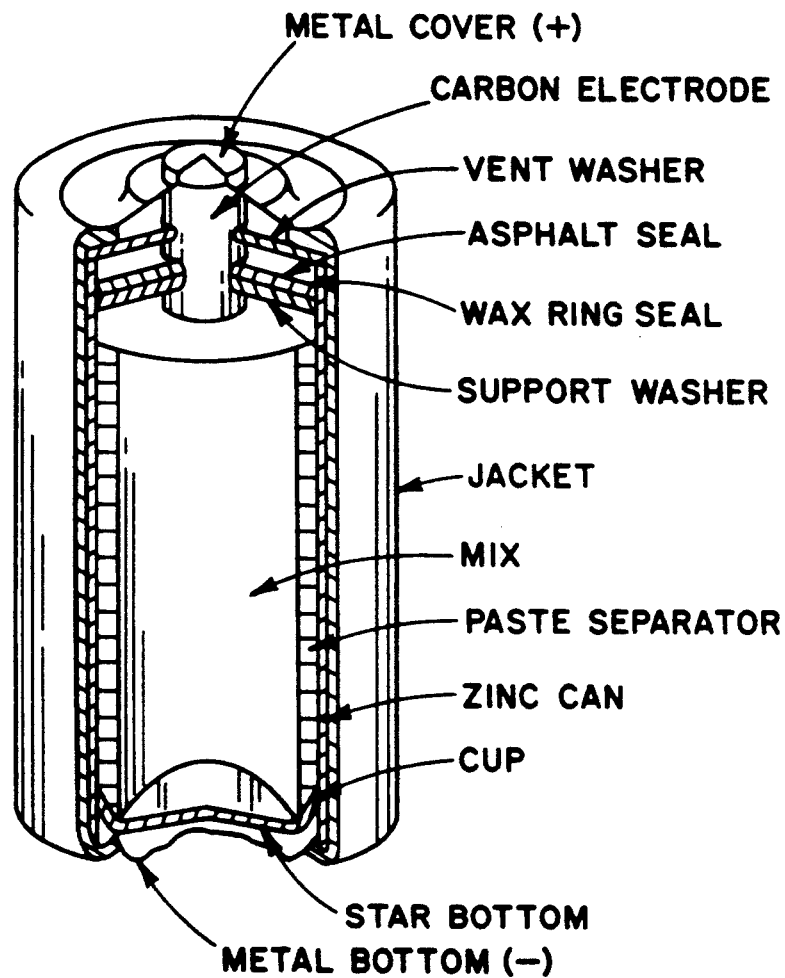
FIG. 3 shows a cross-sectional view of a ready to use consumer dry-cell battery of the prior art.

Referring now to FIG. 2, there is shown a label construction comprising an alternative embodiment of the present invention. Reference numerals in FIG. 2 correspond to like numerals of FIG. 1. FIG. 2 depicts top non-shrinkable plastic layer 8 and adhesive layer 7 as being of less width than the layers below them, including imprint layer 7. Specifically, the top plastic layer 8 and its laminating adhesive are sized to extend less than half of the distance over the "shoulder" of the battery can, and not over the end face of the battery can. In combination with such a narrow top layer 8, an optional protective layer of lacquer or similar material (not shown) may be applied to the exposed imprint at the edges of the label to provide protection from abrasion for the imprint layer.

Similarly, the top non-shrinkable layer of a multilayer label may be entirely comprised of a printed film, applied by conventional processes such as silk screening. Such films may be relatively thick lacquers, or may be polymerizable (curable) materials such as acrylic, ester, or olefinic suspensions. In such instances, a top adhesive layer is not necessary, and may be omitted from the label structure entirely.

It will also be appreciated by those skilled in the art that other alternative embodiments of the present invention include the incorporation of a non-shrinkable top plastic layer in other forms of multilayer battery label such as the common "duplex" labels (which incorporate two layers of plastic, the one closer to the battery can bearing metalization and imprint, and which may be either "metal up" or "metal down" in construction), and "triplex" labels similar to those shown in the prior art which employ three plastic layers.

In practice, typical consumer batteries should not be heated to temperatures of over about 200° F., as such heating may cause damage to the battery or a negative effect on performance or shelf life. It is therefore important that battery labels not be applied with heat in excess of such levels. Choice of a non-shrinkable outer plastic layer, therefore, will typically be made so that plastic shrinkage is less than about 3% at temperatures of 200° F.

The present invention may be embodied in other specific forms without departing from the spirit or essential attributes of the invention. Accordingly, reference should be made to the appended claims, rather than to the foregoing specification, as indicating the scope of the invention.

STATEMENT OF INDUSTRIAL UTILITY

The present invention may be used in the construction of a convention "dry cell" type consumer battery in order to provide a decorative, leak-resistant, insulating covering for the battery body.

What is claimed is:
1. A hard, high surface gloss, multilayered, protective seal battery label disposed on a generally cylindrical battery body having top and bottom end faces and a circumferential surface extending in length between said top and bottom end faces comprising:
   (A) a heat shrinkable inner plastic layer, said inner plastic layer having a central portion which is generally coincident in length with said battery circumferential surface length, said inner plastic layer having and being defined by top and bottom edge portions, said edge portions extending lengthwise from said central portion and projecting beyond said circumferential surface;
   (B) an outwardly visible imprint layer disposed above said inner plastic layer;
   (C) an inner adhesive layer generally coincident in length with said inner plastic layer, said inner adhesive layer being disposed beneath said inner plastic layer;
   (D) an outer adhesive layer, said outer adhesive layer being disposed above said imprint; and
   (E) a non-shrinkable outer plastic layer disposed above said outer adhesive layer, said outer plastic layer being substantially coincident in length with the edge portions of said shrinkable inner plastic layer;

(F) a metal layer disposed adjacent the inner heat-shrinkable layer wherein said top edge portion is shrunk onto said top end face, said bottom portion is shrunk onto said bottom end face, said shrinkable inner plastic layer edge portions being affixed to said end faces by said inner adhesive layer, said outer non-shrinkable plastic layer edge portions being adhesively secured to said inner shrinkable layer by said outer adhesive layer, said outer non-shrinkable layer further being drawn over said end faces by said shrinkable inner plastic layer when said edge portions are shrunk onto said end faces.

2. A hard, high surface gloss, multilayered, protective seal battery label disposed on a generally cylindrical battery body having top and bottom end faces and a circumferential surface extending in length between said top and bottom end faces comprising:

(A) a heat shrinkable inner plastic layer, said inner plastic layer having a central portion which is generally coincident in length with said battery circumferential surface length, said inner plastic layer having and being defined by top and bottom edge portions, said edge portions extending lengthwise from said central portion and projecting beyond said circumferential surface;

(B) an outwardly visible imprint layer disposed above said inner plastic layer;

(C) an inner adhesive layer generally coincident in length with said inner plastic layer, said inner adhesive layer being disposed beneath said inner plastic layer;

(D) an outer adhesive layer, said outer adhesive layer being disposed above said imprint; and (E) a non-shrinkable outer plastic layer disposed above said outer adhesive layer, said outer plastic layer having a length shorter than the edge portions of said inner plastic layer and does not substantially extend over the face of said battery body end faces;

(F) a metal layer disposed adjacent the inner heat-shrinkable layer wherein said top edge portion is shrunk onto said top end face, said bottom portion is shrunk onto said bottom end face, said shrinkable inner plastic layer edge portions being affixed to said end faces by said inner adhesive layer, said outer non-shrinkable plastic layer edge portions being adhesively secured to said inner shrinkable layer by said outer adhesive layer, said outer non-shrinkable layer further being drawn over said end faces by said shrinkable inner plastic layer when said edge portions are shrunk onto said end faces.

3. The battery label of claim 2 wherein said inprint has at least one exposed portion which extends lengthwise so as to overlie at least one of said edge portions.

4. The battery label of claim 3 wherein said outer adhesive layer extends lengthwise so as to overlie said exposed portion of said imprint.

5. The battery label of claim 2 wherein said central portion and said outer adhesive layer are coincident in length.

6. The battery label of claim 3 wherein said exposed portion of said imprint has on its top surface, a protective coating.

7. The battery label of claim 6 wherein said protective coating is formed from adhesive.

8. The battery label of claim 7 wherein said protective coating is printed onto said exposed portion.

9. The battery label of claim 8 wherein said printed protective coating is comprised of a lacquer film layer.

10. A hard, high surface gloss, multilayered, protective seal battery label disposed on a generally cylindrical battery body having top and bottom end faces and a circumferential surface extending in length between said top and bottom end faces comprising:

(A) a heat shrinkable inner plastic layer, said inner plastic layer having a central portion which is generally coincident in length with said battery circumferential surface length, said inner plastic layer having and being defined by top and bottom edge portions, said edge portions extending lengthwise from said central portion and projecting beyond said circumferential surface;

(B) an outwardly visible imprint layer disposed above said inner plastic layer;

(C) an inner adhesive layer generally coincident in length with said inner plastic layer, said inner adhesive layer being disposed beneath said inner plastic layer; and (D) a non-shrinkable outer layer disposed above said inner plastic layer, said outer layer being formed from a printed lacquer film layer which adheres to the top side of said imprint;

(F) a metal layer disposed adjacent the inner heat-shrinkable layer wherein said top edge portion is shrunk onto said top end face, said bottom portion is shrunk onto said bottom end face, said shrinkable inner plastic layer edge portions being affixed to said end faces by said inner adhesive layer, said outer non-shrinkable lacquer film layer being substantially coincident in length with the edge portions of said heat-shrinkable inner plastic layer, said outer non-shrinkable lacquer film layer edge portions being adhesively secured to said inner shrinkable layer by said outer adhesive layer, said outer non-shrinkable lacquer film layer further being drawn over said end faces by said shrinkable inner plastic layer when said edge portions are shrunk onto said end faces.

11. A battery label according to claim 1 or claim 2 or claim 10 further comprising a metal layer, said metal layer being disposed between said inner plastic layer and said inner adhesive layer.

12. A battery label according to claim 1 or claim 2 or claim 10 further comprising a metal layer, said metal layer being disposed between said inner plastic layer and said imprint.

13. A battery label according to claim 11 further comprising a metalization primer layer, said metalization primer layer being disposed between said metal layer and said inner plastic layer.

14. A battery label according to claim 12 further comprising a metalization primer layer, said metalization primer layer being disposed between said metal layer and said inner plastic layer.

15. A battery label of claim 1 wherein said outer adhesive layer is selected from the group consisting of laminating adhesives and contact adhesives.

16. The battery label of claim 15 wherein said outer adhesive layer is a contact adhesive and further wherein said edge portions of said outer non-shrinkable layer are adhesively secured to said end faces by the circumferential edge portion of said outer adhesive layer.

17. A battery label of claim 2 wherein said outer adhesive layer is selected from the group consisting of laminating adhesives and contact adhesives.

18. The battery label of claim 17 wherein said outer adhesive layer is a contact adhesive and further wherein said edge portions of said outer non-shrinkable layer are adhesively secured to said end faces by the circumferential edge portion of said outer adhesive layer.

* * * * *